March 24, 1959  E. K. BOWEN  2,879,114

LUBRICANT SEAL CONSTRUCTION

Filed March 29, 1955  2 Sheets-Sheet 1

United States Patent Office 2,879,114
Patented Mar. 24, 1959

2,879,114

LUBRICANT SEAL CONSTRUCTION

Edward K. Bowen, Mountain View, Calif., assignor, by mesne assignments, to Federal-Mogul-Bower Bearings, Inc., Detroit, Mich., a corporation of Michigan Application March 29, 1955, Serial No. 497,697

8 Claims. (Cl. 308—187.2)

This invention relates to lubricant seals for use between relatively rotating members and more particularly to a single high-strength housing structure therefor and to a unique snap-action, positive means for holding the seal installed. Also featured is the design of the sealing lips and their relationship with a rugged protective housing constructed to support the seal proper outwardly from the opposite ends of an anti-friction bearing assembly.

Although the novel features of the present invention have the widest application to lubricant seals generally and in whatever environment used, yet there is one application where the problem of seal mounting and retention is especially acute, namely, at the ends of anti-friction bearing assemblies. Accordingly, the present disclosure concerns itself primarily with a new seal especially suited for use with such bearings in order to illustrate to advantage the problems confronting the designer and how admirably the present design meets the requirements of this exacting seal application.

It has been common practice to make seal housings of slightly larger diameter than the bore into which they are pressed so that the high friction between the mating surfaces will hold the seal housing anchored in place. Another common installation and anchoring technique heretofore proposed in a great variety of forms involves upsetting or deforming the rim of the seal housing during installation to frictionally engage or interlock with the bore wall. These techniques have not proven as satisfactory as is desired for many reasons. Among these is the fact that for reasons of economy seal housings are customarily stamped from sheet metal. Successive stampings made by the same die from the same sheet of stock often exhibit surprising differences in shape and diameter. This is especially true as respects the surface contour of the peripheral axial wall of the stamping. Though it is intended and appears to be cylindrical, it is not. In fact, there is a decided tendency for this surface to have crests and troughs. Manifestly, only the crests will be in direct pressure contact with the bore wall when the seal is installed. And these contact points unavoidably create high stresses in restricted areas of both the bore wall and the seal housing. Consequently, there is no certainty of a fluid-tight seal between the bore and the seal housing. If the seal is installed in the rim of an anti-friction bearing, the pressure concentrations and variations just referred to are frequently intolerable because of the attendant distortions produced in the bearing raceways. The same detrimental results follow if the anchorage to the bearing raceway is obtained by upsetting or deforming the rim of the seal case, as proposed by other designers in order to overcome the troublesome aspects of other anchorage constructions.

Another suggestion has been to spin a bead in the casing edge in position to fit into a groove in the bore wall. However, this is also attended by numerous disadvantages. It is very difficult to control the dimensions of the bead to the high tolerances required or to avoid distorting the case as well as the sealing lip during the spinning operation. Moreover, a bead occupies an excessively broad band on the rim of the seal housing, particularly in the case of anti-friction bearings where material and machining operation costs of raceway metals are very high.

The present invention circumvents these numerous objections and limitations of prior designs in an eminently satisfactory manner. In essence, the solution comprises stamping the seal housing from somewhat heavier material than is customary and then thinning the over-size cylindrical mounting rim to provide a smooth surface as well as a finished diameter slightly greater than the bore into which it is to be pressed. In carrying out the thinning operation, a narrow band or bead of metal is left at substantially the full thickness of the original sheet stock. This band forms a detent which registers with a groove in the bore wall when the seal is properly installed. By locating the detent at the leading or free rim edge of the case, the latter is reinforced and optimum advantage is taken of the resiliency of the material in the width of the case rim.

Another aspect of the invention concerns providing a long-life seal for a low-cost, heavy-duty, anti-friction bearing assembly designed for use on the journals of freight and passenger cars. Cost considerations dictate bearing raceways of minimum axial width. This means that suitable provision must be made for rigidly and accurately supporting the sealing lip member in a plane offset beyond the ends of the bearing.

Another problem, and a most troublesome one, is the provision of a sealing lip construction equally effective under widely fluctuating pressures within the bearing chamber due to changing temperature conditions. These several diverse requirements are completely fulfilled by the design disclosed hereinbelow.

Accordingly, it is a principal object of this invention to provide a new and greatly improved mode of constructing an oil seal.

Another important object is the provision of a seal housing featuring greater ease of assembly to its operating environment, more positive anchorage, and greater sealing effectiveness between the seal housing and its mounting bore.

Another object is the provision of a seal housing having an accurately finished mounting periphery together with a locking detent formed by a thickened wall portion of the housing.

Yet another object is the provision of a cylindrical seal housing having a radial flange projecting inwardly from one rim edge and a bead projecting from its outer surface adjacent its opposite rim edge adapted to snap into a receiving groove in a bore wall as the seal reaches its proper assembly position therein.

A further object is the provision of an improved anti-friction bearing assembly and lubricant sealing means therefor which is equally effective despite widely varying pressure conditions inside the bearing chamber.

Numerous other objects and advantages of the invention will become apparent from the following detailed specification of an illustrative embodiment taken in connection with the accompanying drawings, wherein.

Figure 1:
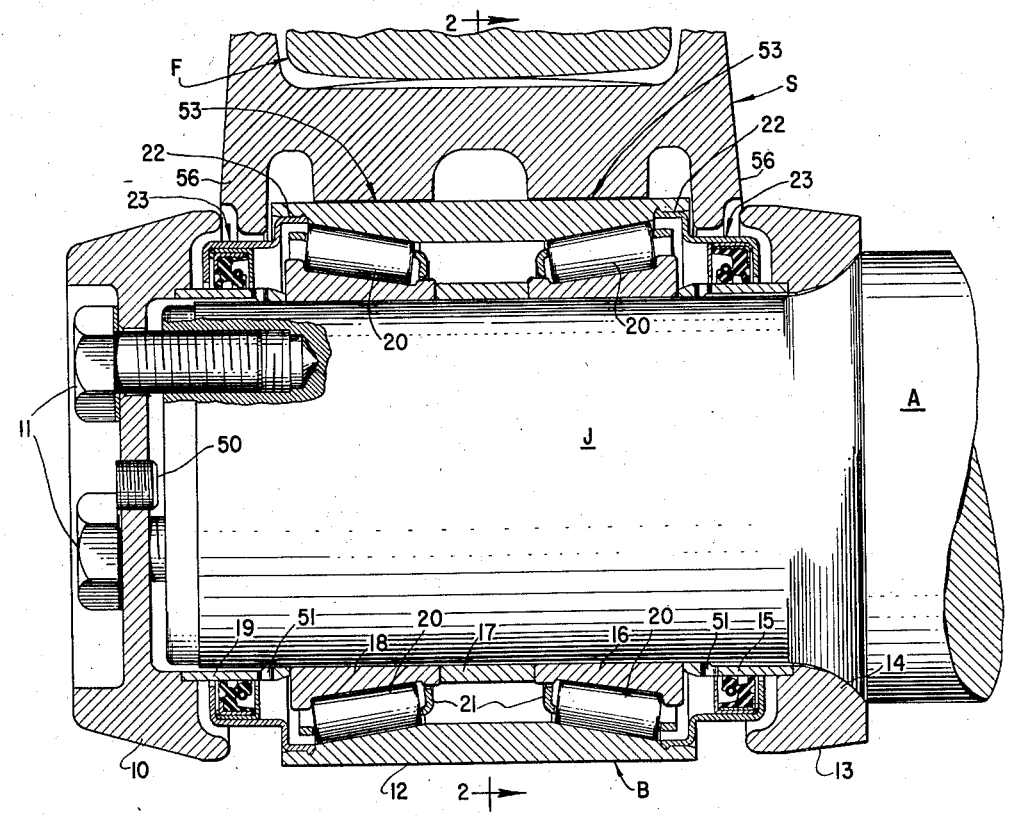
Figure 1 is a longitudinal sectional view through a railway truck journal equipped with a bearing incorporating the invention.

As herein illustrated, the invention is incorporated in a cartridge-type tapered roller bearing assembly mounted upon a railway car truck journal. The truck axle A projects from the outer face of the truck wheel, not shown, and terminates in a trunnion-like journal J. The antifriction bearing assembly generally indicated at B encloses the entire journal J and is tightly clamped thereto by means of end cap 10 and cap screws 11. Encircling the upper half of the bearing assembly and extending downwardly along its opposite sides is a saddle S. This saddle is interposed between the bearing assembly and the customary side frame F at either side of the car truck. In accordance with standard railway truck design, a bolster interconnects the side frames at either side of the truck and one end of the car body is supported on the mid-portion of this bolster.

The bearing assembly comprises an outer cylindrical raceway 12 and an inner raceway comprising a plurality of rings arranged edge-to-edge along the journal J and having a press-fit therewith. These rings include a rear thrust and guard ring 13, the inner rim of which has a fluid-tight fit with the rim of fillet 14 on the journal. Arranged in order along the length of the journal is a sealing lip seating ring 15, a case-hardened raceway ring 16, a spacer ring 17, a second case-hardened raceway ring 18 and a second sealing lip seating ring 19 identical with ring 15. The end faces of each of these rings are accurately finished and abut one another so that when the assembly screws 11 are tightened the entire inner raceway assembly will be clamped tightly together and forced against the rim of fillet 14 at the rear of the journal.

The inner and outer raceway rings are separated by two rings of tapered roller bearing elements 20, 20 held spaced from one another by the usual spacer ring 21. It will, of course, be obvious that non-tapered or cylindrical bearing elements may be employed, if desired, in which case the roller contacting surfaces of the raceways would be parallel to the bearing axis rather than angularly disposed as required for use with tapered elements. Note that raceway rings 12, 16 and 18 project a minimum distance beyond the outer ends of roller elements 20, 20 in view of the high cost of the materials and expensive processing involved in making these rings. The opposite ends of outer raceway 12 are counterbored at 22 to provide a shouldered mounting bore for the dirt and lubricant sealing devices generally indicated at 23. The counterbores, as well as the sealing devices, are preferably identical with one another in the interest of greater manufacturing economy, ease of servicing and avoidance of misassembly of the wrong seal in the field.

Figure 3:
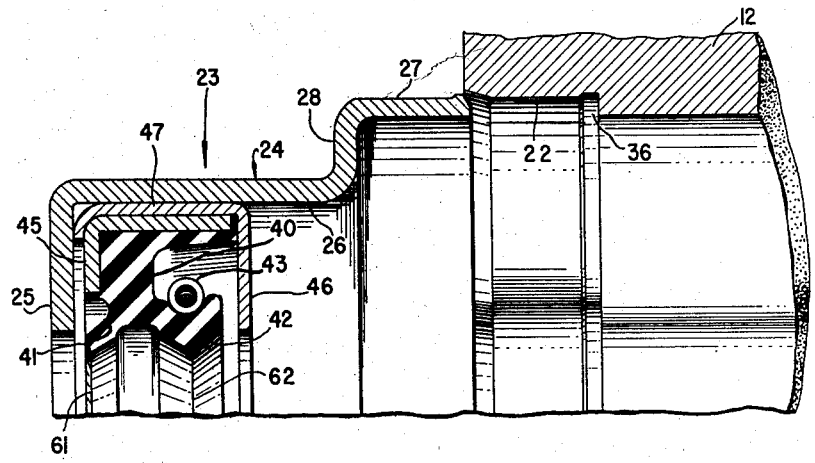
Figure 3 is a fragmentary view, partly in section, showing the seal about to be assembled into a mounting bore at the end of a bearing raceway.
Figure 4:
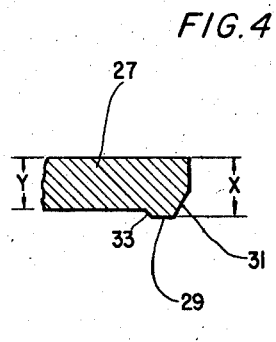
Figure 4 is a fragmentary enlarged view of the housing rim and showing details of the detent bead.
Figure 5:
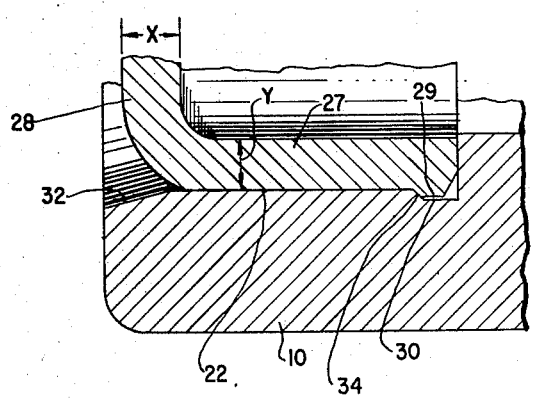
Figure 5 is an enlarged view of the seal housing in its fully assembled position in its mounting bore.

Referring to Figures 3 to 5, it will be seen that the sealing device proper comprises a heavy-walled cupped outer casing 24 having an inturned radially disposed guard flange 25 at its outer end. The sidewall of the casing comprises a small diameter cylindrical section 26 joined to a larger diameter cylindrical section 27 by a radially disposed connecting web 28. The sealing lip structure is housed within cylindrical section 26 and in a plane axially offset from both the inner and outer raceways and will be described presently.

As initially stamped from heavy gauge sheet steel, all portions of casing 24 are of the same nominal thickness. Careful inspection of the finished surface will show many imperfections as well as certain crests, troughs, and other distortions caused primarily by the stamping operation. These are of no particular consequence except as respects the outer surface of the cylindrical mounting rim 27 which is intended to form a fluid-tight friction fit with the accurately finished walls of counterbore 22. A fluid-tight and positive inter-locking connection between counterbore 22 and my sealing device is obtained by making the wall 27 oversize, as initially stamped, to insure an adequate layer of excess metal on its exterior. Thereafter, the outer surface of mounting rim 27 is machine-finished to provide a cylindrical surface of slightly greater diameter than the sidewall of bore 22. This thinning and finishing operation may be done by machine tools or any suitable precision grinding or abrading operation.

In thinning the outer surface of rim 27, I prefer to leave a narrow bead or locking detent 29 immediately adjacent the free rim edge as indicated at 29 in Figures 4 and 5. This detent is preferably obtained by omitting to grind or machine this portion of the outer surface. Thus, by referring to Figures 4 and 5, it will be seen that the thickness of metal at bead 29 is identical with that of web 28, as indicated by the reference X in these two figures. However, the thickness of all other portions of rim 27 is somewhat less as indicated by Y, the difference in thickness representing the amount of material removed to insure an accurate fit with counterbore 22.

Adjacent the inner corner or shoulder of counterbore 22 is an annular detent receiving groove 30 for seating detent 29 when sealing device 23 is properly and fully seated in the counterbore, as shown in Figure 5. Both the rim edge 31 of casing 24 and the entrance edge 32 of the counterbore may be chamfered to facilitate piloting the sealing device into the counterbore. Likewise, the trailing corner 33 of detent 29 as well as the mating edge 34 of receiving groove 30 may be chamfered as an aid in disengaging detent 29 from the groove should disassembly of the sealing device become necessary.

Since the free or leading edge of housing rim 27 has no underlying support, it is preferable to locate bead 29 as close as possible to this edge. This arrangement takes maximum advantage of the resiliency of the thinned cylindrical wall 27. Moreover, bead 29 serves to reinforce and strengthen the free rim edge of the seal housing.

The highly important sealing lip structure comprises a unitary ring of synthetic elastomeric rubber material having a high resistance to attack by lubricating mediums. This ring may be described as having a very thick main body 40 having a very short and rather thin dust lip 41 projecting outwardly from its inner periphery, and a companion very short lubricant sealing ring 42 projecting axially in the opposite direction from the other corner of its inner periphery. Both the dust and lubricant lips are provided with sharp accurately finished sealing edges 61, 62, respectively, having a diameter slightly less than the outer surface of seating rings 15 or 19 with which they form a running seal. The lubricant sealing lip 42 is extremely short, but there is sufficient room for a groove to seat a garter spring 43 which supplements the natural resiliency of the elastomeric material in holding lip 42 seated on one of the seating rings.

The reason for the unusually short lips 41 and 42, as well as for the thickness of ring 40 with which they are preferably integral, is that this particular design has been found essential to prevent the widely fluctuating pressures characteristic of the operating environment from adversely affecting the effectiveness and efficiency of sealing lip 42. Also essential to this end is the presence of the radially disposed rigid supporting ring 45 to which the main body 40 of elastomer is bonded. It will be noted that the inner edge of ring 45 terminates as close as possible to lips 41 and 42 and yet permit limited radial movement of the lips. However, since the eccentric or runout movements between the relatively rotating parts of anti-friction bearings are small, the allowance made for the radial flexing of the sealing lips can be held to a minimum. Accordingly, supporting ring 45 may terminate very close to the lips. This circumstance, together with the very thick layer of rubber employed to support the lips and the extremely short flex arm of inner lip 42, accounts for the unusually long leak-proof service life obtained with this seal despite recurrent pressure changes ranging from 0 to 20 pounds per square inch.

It is desirable to provide lubricant lip 42 with a protective guard ring similar in purpose and function to outer guard ring 25. This may be accomplished by the use of a cupped metal casing having a radially disposed guard flange 46 and an outer cylindrical sidewall 47 nested about cupped ring 45 and having a diameter to form a tight press-fit with the interior of cylindrical section 26 of the seal housing. When assembled in this manner, it will be clear that radial guard rings 25 and 46 are spaced opposite the respective free edges of lips 41 and 42 to safeguard the same against injury. Moreover, a continuation of guard ring 25 extends axially from the sealing structure proper and terminates in the cylindrical mounting rim 27.

The assembly of the sealing device 23 at the ends of raceway 12 is a very simple matter. It is merely necessary to rest the leading edge of rim 27 against chamfer 32 at the entrance to the bore and then press the casing axially into the bore. The beveled corner 31 of the rim depresses locking detent 29 inwardly thereby deforming the casing rim to an extent well within the elastic limits of the material. Accordingly, no permanent deformation takes place. As the sealing device reaches its assembled position, bead 29, being in registry with receiving groove 30, snaps into the groove to lock sealing device securely in place with the rim edge of wall 27 seated against the shoulder at the base of counterbore 22.

After both seals have been installed, it is a simple matter to install the cartridge unit over the journal J and lock it in place by cap screws 11. The bearing assembly carries an initial charge of a suitable lubricant. This initial charge may be supplemented by removing plug 50 in end cap 10 and attaching a pressurized lubricant supply tube. After the cavity between the cap and the journal end is filled, the lubricant flows beneath seating ring 19 and upwardly through one or more openings 51 into the bearing cavity. As soon as the bearing has been fully charged, the supply tube is removed and plug 50 is replaced.

Figure 2:
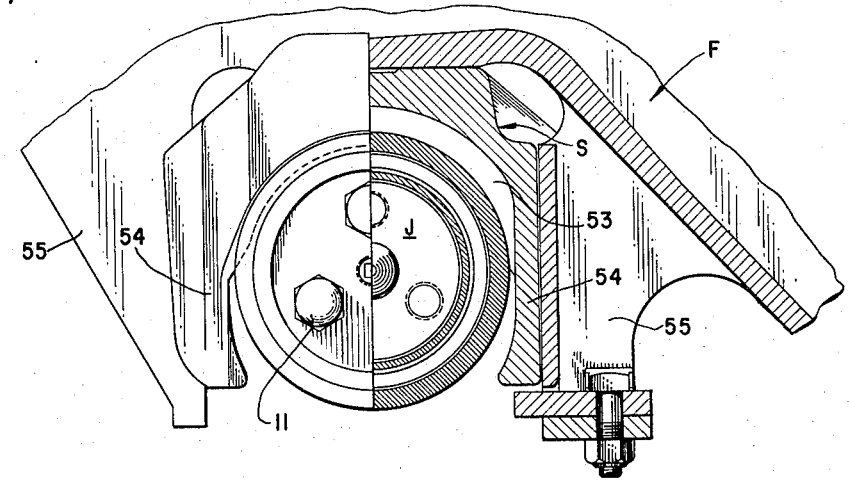
Figure 2 is a front end view of Figure 1 with the left-half in elevation and the right-half in section along line 2—2.

From Figures 1 and 2, it will be observed that saddle S encircles the upper half of raceway 12 and is supported directly thereon through large contact surfaces 53, 53. The opposite ends of these contact areas terminate in downwardly extending legs 54 and the latter, together with the saddle proper, fits loosely between the downwardly directed retaining arms or pedestals 55, 55 of side frame F. Saddle S also includes heavy guard flanges 56, 56 which project inwardly across the opposite ends of raceway 12. These flanges prevent axial displacement of the saddle with respect to the bearing. However, as made clear by Figure 1, the design is such that these flanges cannot contact any part of the seal casing to distort or damage the same. This is for the reason that radial web 28 of the seal housing is located slightly inside the rim edge of the outer raceway, while cylindrical section 26 is of appreciably smaller diameter than guard flange 56.

While only a single embodiment of the invention has been specifically disclosed, it will be quite apparent that the essential features may be constructed in many different ways or employed in seal applications differing widely from those discussed above. In particular, it is to be understood that the various novel aspects of the invention may be utilized individually or in various combinations thereof if this should be found desirable in meeting the requirements of a specific problem. Moreover, while the sealing device disclosed in detail is especially effective for railway truck anti-friction bearings, manifestly it is equally suitable for countless other lubricant sealing applications.

I claim:

1. That improvement in lubricant seals of the type adapted to have a snap-acting fluid-tight interlock with the grooved wall of a mounting bore which comprises, forming a cupped casing from heavy gauge sheet metal having a cylindrical sidewall and a radially directed inturned flange at one end thereof, trimming a layer of metal from the exterior of the casing sidewall to provide a finished diameter slightly in excess of that of the mounting bore for said seal while leaving an untrimmed band of metal slightly narrower than the groove in said bore wall whereby the same is adapted to snap into said groove in said bore upon being telescoped thereinto, and mounting a ring within the flanged end of said casing which ring is provided with a resilient annular sealing lip.

2. The product formed by the process of claim 1.

3. In combination, an anti-friction bearing having an outer non-rotating cylindrical raceway and an inner rotatable raceway separated therefrom by rings of roller elements, seal seating rings opposite the ends of said inner raceway and rotatable along therewith, the ends of said outer raceway having a counterbore therein provided with a groove in its side wall, a lubricant sealing device adapted to be installed in the annular gap between each of said seating rings and the adjacent end of the outer raceway, said sealing device comprising a pair of oppositely extending annular sealing lips formed from a unitary piece of resilient elastomer, one of said lips facing axially away from said bearing and seating against said seating ring lightly under its own resiliency for the purpose of excluding foreign matter from the bearing, the other lip facing axially toward the interior of said bearing and having an outer periphery with a spring biasing said other lip into sealing engagement with said seating ring to retain lubricant against escape from the bearing without exerting pressure on said one lip, means including a cupped metal casing for supporting said sealing lips concentrically of said sealing ring in a plane offset outwardly beyond the end of said outer raceway, said metal casing having a radial flange terminating close to said seating ring and axially beyond the free edge of said foreign matter excluding lip, said casing having a cylindrical section adapted to extend into the bore of said outer raceway with a press-fit and having a bead on its exterior positioned to interlock with the groove in the bore sidewall.

4. In an anti-friction bearing assembly of the type having inner and outer relatively rotating raceways held separated by at least one ring of roller bearing elements; that improvement which comprises a dirt and lubricant sealing device for use in sealing the annular gap between said raceways at the opposite ends thereof irrespective of widely varying pressure conditions within the bearing chamber defined by said raceways, said sealing device including an axially thick ring of elastomeric material resistant to attack by lubricants and supported against deflection throughout the major portion of its radial extent by a rigid metal ring, an annular dust lip of short radial extent integral with and projecting axially outboard from the exterior inner corner of said elastomer ring, an annular lubricant sealing lip of short radial extent integral with and projecting axially inboard from the interior inner corner of said elastomer ring, so that said lips are on opposite axial ends of said elastomer ring, spring means encircling said lubricant lip and urging the same radially inward, said dust lip being independent of the pressure of said spring means, rigid protective housing means for said sealing lips including a pair of rigid guard rings shaped to enclose said elastomer ring and to extend radially inward closely beside the end faces of each of said sealing lips, said housing means including a cylindrical mounting rim offset entirely to one side of said sealing lips and adapted to have a fluid-tight press-fit with a cylindrical wall of slightly different diameter formed at the end of said outer raceway.

5. That improvement in providing a snap-acting, fluid tight press fit interlock between a lubricant sealing device and a bore support therefor in one of two relatively rotating parts which improvement comprises, forming a cupped ring from heavy-gauge sheet metal to provide a general cylindrical sidewall and a radially directed end wall one edge thereof, forming a cylindrical walled bore a mounting structure for said sealing device, forming an annular locking detent groove in the wall of said bore, removing a layer of metal from the outer cylindrical surface of said ring except for a band narrower than the width of said detent groove, the finished cylindrical surface of said cupped ring after the removal of said layer being slightly greater in diameter than that of said supporting bore and said narrow detent band being so positioned thereon as to snap into and interlock with the annular groove in the sidewall of said bore as said sealing device is telescoped into its fully assembled position therewith.

6. The product formed by the process of claim 5.

7. In combination, an anti-friction bearing having an outer non-rotating cylindrical raceway and an inner rotatable raceway separated therefrom by rings of roller elements, seal seating rings, opposite the ends of said inner raceway and rotatable along therewith, the ends of said outer raceway having a counterbore therein, a lubricant sealing device adapted to be installed in the annular gap between each of said seating rings and the adjacent end of the outer raceway, said sealing device comprising a pair of oppositely extending annular sealing lips formed from a unitary piece of resilient elastomer, one of said lips facing axially away from said bearing and seating against its said seating ring lightly under its own resiliency for the purpose of excluding foreign matter from the bearing, the other lip facing axially toward the interior of said bearing and having an outer periphery supporting a spring biasing said other lip into sealing engagement with said seating ring to retain lubricant against escape from the bearing without exerting pressure on said one lip; and means including a cupped metal casing for supporting said sealing lips concentrically of said seating ring in a plane offset outwardly beyond the end of said outer raceway, said metal casing having a radial flange terminating close to said seating ring and axially beyond the free edge of said foreign-matter-excluding lip, said casing having a cylindrical section adapted to extend into the counterbore of said outer raceway with a press fit.

8. In an anti-friction bearing assembly of the type having inner and outer concentric raceway means held separated by a ring of anti-friction elements, one of said raceways having a bore in the rim thereof provided with a shallow groove in its side wall; that improvement which comprises a lubricant sealing ring, said ring including a cupped metal case having a cylindrical side wall adapted to telescope into said bore with a press-fit, said casing side wall including a locking bead projecting from the surface of said cylindrical wall and formed by a thickened projecting section of said wall, said wall otherwise being of substantially constant thickness thinner than said bead, said bead being so positioned as to extend into and interlock with the shallow groove in the bore side wall when the sealing ring is properly assembled into the bore, and resilient annular sealing lip means secured to the other rim of said casing adapted to form a running fluid-tight seal with the other of said raceway means, the leading free rim of the cylindrical casing side wall being beveled to provide a pilot for guiding the same into its assembled position in said bore, said bead having a leading edge in common with said bevel, said bead serving to reinforce and strengthen the casing rim in addition to providing a lock holding said sealing ring assembly to the bearing.

References Cited in the file of this patent

UNITED STATES PATENTS

| | | |
|---|---|---|
| 1,561,378 | Trautner et al. | Nov. 10, 1925 |
| 1,908,474 | Dewees | May 9, 1933 |
| 2,155,584 | Bryant | Apr. 25, 1939 |
| 2,185,339 | Hickling | Jan. 2, 1940 |
| 2,316,713 | Proctor | Apr. 13, 1943 |
| 2,613,090 | Hickling | Oct. 7, 1952 |
| 2,651,554 | Recknagel | Sept. 8, 1953 |
| 2,695,801 | Kosatka | Nov. 30, 1954 |

FOREIGN PATENTS

| | | |
|---|---|---|
| 578,526 | Great Britain | July 2, 1946 |
| 636,076 | Great Britain | Apr. 19, 1950 |

OTHER REFERENCES

Product Engineering, November 1948, pages 122–123.